(12) United States Patent
Asai et al.

(10) Patent No.: US 7,518,667 B2
(45) Date of Patent: Apr. 14, 2009

(54) METHOD FOR MANUFACTURING A LIQUID CRYSTAL DISPLAY DEVICE

(75) Inventors: Takuya Asai, Tokyo (JP); Syouichi Kuroha, Tokyo (JP); Takeshi Sasaki, Tokyo (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 11/193,323

(22) Filed: Aug. 1, 2005

(65) Prior Publication Data

US 2005/0264742 A1 Dec. 1, 2005

Related U.S. Application Data

(62) Division of application No. 10/354,141, filed on Jan. 30, 2003, now Pat. No. 7,012,665.

(30) Foreign Application Priority Data

Jan. 31, 2002 (JP) ............................... 2002-024864

(51) Int. Cl.
G02F 1/136 (2006.01)
G02F 1/1343 (2006.01)
(52) U.S. Cl. ......................................... 349/46; 349/141
(58) Field of Classification Search ................. 349/141, 349/139, 46, 38
See application file for complete search history.

(56) References Cited

U.S. PATENT DOCUMENTS

| 5,334,860 | A | * | 8/1994 | Naito ............................. 257/59 |
| 5,907,379 | A | * | 5/1999 | Kim et al. ..................... 349/141 |
| 6,049,369 | A | | 4/2000 | Yanagawa et al. ........... 349/141 |
| 6,064,460 | A | | 5/2000 | Ohta et al. |
| 6,201,590 | B1 | | 3/2001 | Ohta et al. ................... 349/141 |
| 6,678,018 | B2 | | 1/2004 | Park et al. ....................... 349/43 |
| 6,697,141 | B2 | | 2/2004 | Yamakita et al. ............ 349/141 |

(Continued)

FOREIGN PATENT DOCUMENTS

CN  1153313 A  1/1996

(Continued)

OTHER PUBLICATIONS

Chinese Office Action dated May 21, 2004 with English translation.

(Continued)

*Primary Examiner*—James A Dudek
(74) *Attorney, Agent, or Firm*—McGinn IP Law Group, PLLC

(57) ABSTRACT

In a provided LCD device, a common electrode and a picture element electrode which make up the main portion of a unit picture element of the LCD device are both made up of one thin conductive layer made of a Cr layer, while a common electrode wiring line and a data line or a like which are connected to the common electrode and the picture element electrode respectively are each formed as a stacked film made up of a first conductive film (thick Cr layer) and a second conductive film (thin Cr layer). This configuration enables increasing the film thickness of wiring lines such as, especially, the common electrode wiring line and the data line or the like, thus decreasing a wiring line resistance thereof.

20 Claims, 11 Drawing Sheets

U.S. PATENT DOCUMENTS 6,911,668 B2 * 6/2005 Youn et al. .................. 257/59

FOREIGN PATENT DOCUMENTS

| EP | 0724183 | 7/1997 |
| --- | --- | --- |
| JP | 9-73101 | 3/1997 |
| JP | 10-048670 | 2/1998 |
| JP | 10-260431 | 9/1998 |
| JP | 2001-142092 | 5/2001 |
| JP | 2001-183639 | 7/2001 |
| JP | 2001-194676 | 7/2001 |
| JP | 2003-222903 | 8/2001 |
| JP | 2001-250958 | 9/2001 |
| JP | 2001-264809 | 9/2001 |
| JP | 2001-311956 | 11/2001 |

OTHER PUBLICATIONS

Japanese Office Action dated Mar. 30, 2004 with partial English translation.

* cited by examiner

METHOD FOR MANUFACTURING A LIQUID CRYSTAL DISPLAY DEVICE

CROSS-REFERENCE TO RELATED APPLICATION

This application is a divisional application of U.S. patent application Ser. No. 10/354,141, filed Jan. 30, 2003 now U.S. Pat. No. 7,012,665.

BACKGROUND OF THE INVENTION

1. Field of the Invention

The present invention relates generally to an LCD (Liquid Crystal Display) device and a method for manufacturing the same and, more particularly to, an IPS (In-Phase Switching)-type LCD device having a configuration that liquid crystal is hermetically sealed between a TFT (Thin Film Transistor) substrate and an opposite substrate and also a picture element electrode and a common electrode are arranged on the TFT substrate in such a manner as to be opposite to each other on the same plane.

The present application claims priority of Japanese Patent Application No. 2002-024864 filed on Jan. 31, 2002, which is hereby incorporated by reference.

2. Description of the Related Art

An LCD device is widely used as a monitor and a display device in a variety of information equipment units. The LCD device is made up of a TFT substrate on which is there formed a TFT which operates as a switching element, an opposite substrate, and liquid crystal material which is hermetically sealed between these substrates. Such LCD devices are roughly classified into a TN (Twisted Nematic) type LCD device and an IPS (In-Phase Switching) type LCD device in view of display mechanism.

A TN-type LCD device has such a construction that a plurality of picture element electrodes is arranged on the TFT substrate and a plurality of common electrodes is arranged on an opposite substrate, whereby a driving voltage is applied between the arbitrary picture element electrode and the corresponding common electrode so as to generate an electric field in a direction perpendicular to the TFT substrate and the opposite substrate in operation, so-called perpendicular electric field. The IPS-type LCD device, on the other hand, has such a construction that on one of the two substrates, for example, on a TFT substrate are there arranged a plurality of picture element electrodes and a plurality of common electrodes, each of which is configured to be opposite to the corresponding one of picture element electrodes in a direction parallel to the TFT substrate, whereby a driving voltage is applied between the two electrodes to generate an electric field in a horizontal direction with respect to the substrates in operation, so-called horizontal electric field. Thus, in the case of the IPS-type LCD device, orientation of an LCD molecular occurs along the surface of substrate, for example, the TFT substrate and so, owing to this principle, has an advantage that a wider angle of visibility can be obtained than by the TN-type LCD device. The IPS-type LCD device has become, therefore, used widely and preferably. Such the IPS-type LCD device is disclosed, for example, in Japanese Patent Application Laid-open No. Hei 10-48670.

FIG. 9 shows only one unit picture element of a monochromatic LCD device. FIG. 11, on the other hand, shows only a TFT substrate. As shown in FIGS. 9 to 11, this monochromatic LCD device has a liquid crystal 103 sealed hermetically between a TFT substrate 101 and an opposite substrate 102, in such a configuration that the TFT substrate 101 includes a first transparent insulation substrate 106 made of glass or a like, a first polarizing plate 107 formed on the outer side face of the first transparent insulation substrate 106, a scanning line (gate bus line) 108 which is made of Cr (chrome), Al (aluminum), Mo (molybdenum), or a like and formed on part of the inner side face of the first transparent insulation substrate 106, common electrodes 109 formed on other parts of the surface of the first transparent insulation substrate 106, an inter-layer insulation film 110 which is made of $SiO_2$ (silicon oxide film), SiN (silicon nitride film), or a like and formed in such a manner as to cover the scanning line 108 and the common electrodes 109 in order to provide a gate insulation film partially, a semiconductor layer 113 which is made of an a-Si (amorphous silicon) film or a like and formed above the scanning line 108 via the inter-layer insulation film 110, ohmic layers 113A and 113B which are made of an $n^+$ type a-Si film or a like and formed at both ends of the semiconductor layer 113, a drain electrode 116 and a source electrode 117 which are made of Cr, Al, Mo, or a like and formed in such a manner as to be connected to the ohmic layers 113A and 113B respectively, picture element electrode 121 and a data line 122 which are formed integrally with the drain electrode 116 and the source electrode 117 respectively on the inter-layer insulation film 110, a passivation film (protecting insulation film) 125 which is made of $SiO_2$, SiN, or a like and formed in such a manner as to cover the picture element electrode 121 and the data line 122, and a first oriented film 127 which is made of poly-imide or a like and formed in such a manner as to cover the picture element electrode 121 and the data line 122 via the passivation film 125. In this construction, the scanning line 108, the semiconductor layer 113, the drain electrode 116, and the source electrode 117 are combined to make up a TFT 129. It is to be noted that such a portion of the scanning line 108 as to be present directly below the semiconductor layer 113 acts as a gate electrode. Furthermore, the data line 122 acts as a drain wiring line. Similarly, portions of the common electrode 109 other than such a portion thereof as to be opposite to the picture element electrode 121 serve as a common electrode wiring line 109A.

The opposite substrate 102, on the other hand, includes a second transparent insulation substrate 131 made of glass or a like, a second polarizing plate 133 formed on the outer side face of the second transparent insulation substrate 131 via a conductive layer 132 for preventing electrostatic-electricity, a plurality of black matrix layer regions 134 made of Cr, Ti, or a like, each of which is formed on the inner side face of the second transparent insulation substrate 131, a flattening film 136 formed in such a manner as to cover the black matrix layer regions 134, and a second oriented film 137 which is made of poly-imide or a like and formed on the flattening film 136. Furthermore, a direction arrow indicates a rubbing direction 139 in which rubbing processing is conducted on the first oriented film 127.

This rubbing direction 139 is set as inclined by a constant angle with respect to a longitudinal direction (direction in which the data line 122 is formed) in order to securely determine a twisting direction of the liquid crystal 103 when it is injected into between the TFT substrate 101 and the opposite substrate 102.

The above-mentioned rubbing processing is, as shown in FIG. 12, conducted by revolving a rubbing roller 80 made up of a revolving roller 77 having rubbing hair 79 attached thereto around it via a rubbing cloth 78 so that the TFT substrate 101 as provided thereon with the first oriented film 127 may be moved under the rubbing roller 80, to rub the surface of the first oriented film 127 with the rubbing hair 79, thus forming rubbing trenches.

The following will describe a method for manufacturing a conventional LCD device along steps thereof with reference to FIGS. 13A to 13B through FIG. 16A to 16 B. FIGS. 13A, 14A, 15A, and 16A show respective cross-sectional views which correspond to a cross-sectional view taken along line C-C of FIG. 9, while FIGS. 13B, 14B, 15B, and 16B show respective cross-sectional views which correspond to a cross-sectional view taken along line D-D of FIG. 9.

First, as shown in FIGS. 13A and 13B, on the first transparent insulation substrate 106 made of glass or a like, a conductive film which is made of Cr, Al, Mo, or a like and has a film thickness of 200-400 nm is formed throughout the surface by sputtering and then, using a known photolithographic method, is patterned to form the scanning line 108 simultaneously with the common electrode 109 and the common electrode wiring line 109A which are made of this conductive film. The common electrode wiring line 109A, however, is not shown in FIGS. 13A and 13B.

Next, as shown in FIGS. 14A and 14B, the inter-layer insulation film 110 which is made of a $SiO_2$ film, a SiN film, or the like and partially provides a gate insulation film is formed throughout the surface by using a CVD (Chemical Vapor Deposition) method, on which the inter-layer insulation film 110 are sequentially formed the semiconductor layer 113 made of a-Si or the like and the ohmic layers 113A and 113B made of an $n^+$ type a-Si film or the like at both ends of the semiconductor layer 113. Next, a conductive film which is made of Cr, Al, Mo, or the like and has a film thickness of 200-400 nm is formed throughout the surface by sputtering and then is patterned by a known photolithographic method to form the picture element electrode 121, the drain electrode 116, the source electrode 117, and the data lines 122 simultaneously.

Next, as shown in FIGS. 15A and 15B, the passivation film 125 made of a $SiO_2$ film, a SiN film, or the like is formed throughout the surface by using a CVD method and then, the first oriented film 127 made of poly-imide or the like is formed in such a manner as to cover the passivation film 125. Then, as shown in FIG. 12, the rubbing roller 80 is used to conduct rubbing processing on the first oriented film 127.

Next, as shown in FIGS. 16A and 16B, the liquid crystal 103 is hermetically sealed between the TFT substrate 101 and the opposite substrate 102 which is made by sequentially forming a plurality of black matrix layers regions 134 made of Cr, Ti, or the like, the flattening film 136, and the second oriented film 137 made of poly-imide or the like on the inner side face of the second transparent insulation substrate 131 made of glass or the like. Then, the first polarizing plate 107 is formed on the outer side face of the TFT substrate 101 and the second polarizing plate 133 is formed via the conductive layer 132 for preventing electrostatic-electricity on the outer side of the opposite substrate 102, thus completing such the conventional LCD device as shown in FIGS. 9 to 11.

In such a configuration of the above-mentioned LCD device that the main portion of the unit picture element is made up of the common electrode 109 and the picture element electrode 121 which are opposite to each other in a comb-teeth shape, the common electrode 109 and the picture element electrode 121 are formed at the same time as the other electrodes or the wiring lines are formed, from a viewpoint of an advantage in manufacturing method. That is, as described above, the common electrode 109 is formed of the same conductive material as the scanning line 108 and the common electrode wiring line 109A and at the same time as they are formed. Furthermore, the picture element electrode 121 is formed of the same material as the drain electrode 116, the source electrode 117, and the data line 122 at the same time as they are formed. Accordingly, it is possible to eliminate a manufacturing process of forming the electrode or the wiring line, thus avoiding an increase in costs.

In the conventional LCD device and method for manufacturing the same, however, since a common electrode 109 and a picture element electrode 121 which make up the main portion of a unit picture element are formed to have a relatively thick film, a step occurs on the first oriented film 127 formed on a protecting insulation film via these two electrodes, so that rubbing processing so as to form the first oriented film 127 cannot be sufficiently performed, which is a problem.

That is, in the conventional LCD device and the method for manufacturing the same, as described above, although the common electrode 109 and the picture element electrode 121 which make up the main portion of a unit picture element are both formed of the same conductive material as the other electrodes or wiring lines and at the same time as they are formed, two kinds of electrodes, the common electrode 109 and the picture element electrode 121 are formed to have a relatively thick film, so that a step 140 occurs in the first oriented film 127 as shown in FIG. 10 when the first oriented film 127 is formed via the passivation film 125 on these two electrodes, the common electrode 109 and the picture element electrode 121 and, therefore, such rubbing processing as shown in FIG. 12 cannot sufficiently be conducted because it is interfered by the step 140.

The above-mentioned LCD device, which is widely used as a monitor of medical-care equipment, has a performance requirement of, especially, a high contrast for this type of monitor. To satisfy this requirement, it is important in configuration of the LCD device to conduct rubbing processing sufficiently on the first oriented film 127 formed on the TFT substrate 101 in order to improve the orientation of the liquid crystal 103. On a conventional LCD device, however, the rubbing processing cannot sufficiently be conducted for the reason described above, so that a high contrast has been difficult to achieve.

It is to be noted that the film thickness of the common electrode 109 and the picture element electrode 121 is determined by the required film thickness conditions of the common electrode wiring line 109A which is formed simultaneously with these two electrodes, the common electrode 109 and the picture element electrode 121, or of the data line 122. That is, if the LCD device is viewed as a display product, it must satisfy a basic concept of saving on power dissipation as much as possible; so that, in such the LCD device as described above in which a number of unit picture elements are integrated to make up the product, it is necessary to reduce the wiring line resistance of the data line 122 and the common electrode wiring line 109A which supplies power to the common electrode 109 and the picture element electrode 121 which make up the main portion of the unit picture element. To do so, it is in turn necessary to increase the film thickness of these two wiring lines, the common electrode wiring line 109A and the data line 122, which results in formation of a relatively thick film of the two electrodes, the common electrode 109 and the picture element electrode 121, as well which are formed simultaneously. The common electrode 109 and the picture element electrode 121 themselves function sufficiently even if they are relatively thin and so need not be formed as thick as the common electrode wiring line 109A and the data line 122.

Therefore, to decrease the size of the step 140 in the oriented film 127 which is formed on both of the electrodes, the common electrode 109 and the picture element electrode 121, it is necessary to form a conductive material as a relatively thin film, which has been, however, difficult in a conventional LCD device and by a method for manufacturing the same. If the rubbing processing cannot sufficiently be conducted as in the case of the conventional method, the contrast is deteriorated drastically, especially in a normal-black LCD device.

SUMMARY OF THE INVENTION

In view of the above, the present invention has been developed, and it is an object of the present invention to provide an LCD device and a method for manufacturing the same which can decrease a size of a step which occurs on an oriented film, to achieve high contrast without increasing wiring line resistance.

According to a first aspect of the present invention, there is provided a liquid crystal display device, including:

a first substrate;

a second substrate being opposite to the first substrate;

a liquid crystal material hermetically sealed between the first substrate and the second substrate;

a plurality of data lines, each of which a plurality of picture element electrodes are connected to, the plurality of data lines and the plurality of picture element electrodes being formed on the first substrate; and a plurality of common electrode wiring lines, each of which a plurality of common electrodes are branched off from, the plurality of common electrode wiring lines and the plurality of common electrodes being formed on the first substrate, wherein each of the picture element electrodes and each of the common electrodes are located in such a manner as to be opposite to each other in an approximately planar direction, and wherein the plurality of data lines and the plurality of common electrode wiring lines are formed as thick conductive films, while the plurality of picture element electrodes and the plurality of common electrodes are formed as thin conductive films.

According to a second aspect of the present invention, there is provided a liquid crystal display device, including:

a first substrate;

a second substrate being opposite to the first substrate;

a liquid crystal material hermetically sealed between the first substrate and the second substrate;

a plurality of data lines, each of which a plurality of picture element electrodes are connected to respectively through a thin film transistor, the plurality of data lines and the plurality of picture element electrodes being formed on the first substrate; and a plurality of common electrode wiring lines, each of which a plurality of common electrodes are branched off from, the plurality of common electrode wiring lines and the plurality of common electrodes being formed on the first substrate, wherein each of the picture element electrodes and each of the common electrodes are located in such a manner as to be opposite to each other in an approximately planar direction, and wherein the plurality of data lines and the plurality of common electrode wiring lines are formed as thick conductive films, while the plurality of picture element electrodes and the plurality of common electrodes are formed as thin conductive films.

In the foregoing first or second aspect, a preferable mode is one that wherein further includes: a plurality of scanning lines formed as thin conductive films on the thin film transistor substrate, wherein the thin film transistor is connected to the scanning line.

Also, a preferable mode is one that wherein a drain electrode and a source electrode, making up respectively the thin film transistor, are formed as the thick conductive film.

Also, a preferable mode is one wherein the thick conductive film is formed as a stacked film comprising a first conductive film making up a lower layer and a second conductive film making up an upper layer.

Also, a preferable mode is one wherein the first conductive film and the second conductive film are made up of a same kind of conductive film.

Also, a preferable mode is one wherein the thick conductive film and the thin conductive film are made up of a same kind of conductive film.

Also, a preferable mode is one wherein a width of the second conductive film as the upper layer is approximately same as or larger than a width of the first conductive film as the lower layer.

According to a third aspect of the present invention, there is provided a method for manufacturing a liquid crystal display device, including: a thin film transistor substrate; an opposite substrate being opposite to the thin film transistor substrate; a liquid crystal material hermetically sealed between the thin film transistor substrate and the opposite substrate; a plurality of data lines, each of which a plurality of picture element electrodes are connected to respectively through a thin film transistor having a semiconductor layer region, a drain electrode and a source electrode, the plurality of data lines and the plurality of picture element electrodes making up a surface portion of the thin film transistor substrate; and a plurality of common electrode wiring lines, each of which a plurality of common electrodes are branched off from, the plurality of common electrode wiring lines and the plurality of common electrodes making up a surface portion of the thin film transistor substrate, wherein each of the picture element electrodes and each of the common electrodes are located in such a manner as to be opposite to each other in an approximately planar direction; the method comprising an opposite substrate forming processing and a thin film transistor forming processing, wherein the thin film transistor substrate forming processing includes:

a first step of forming a first conductive film on a transparent insulation substrate and then patterning the first conductive film to form simultaneously a plurality of lower-layer scanning lines making up respectively a lower portion of a scanning line serving as a gate electrode of the thin film transistor and a plurality of lower-layer common electrode wiring lines making up respectively a lower portion of the common electrode wiring line;

a second step of forming a second conductive film on the transparent insulation substrate and then patterning the second conductive film to form simultaneously a plurality of upper-layer scanning lines making up respectively an upper portion of the scanning line and a plurality of upper-layer common electrode wiring lines making up respectively an upper portion of the common electrode wiring line;

a third step of forming a plurality of the semiconductor layer regions via an inter-layer insulation film on the transparent insulation substrate, subsequently forming a third conductive film on the semiconductor layer, and then patterning the third conductive film to form simultaneously a plurality of lower-layer data lines making up respectively a lower portion of the data lines, a plurality of lower-layer drain electrodes making up respectively a lower portion of the drain electrode, and a plurality of lower-layer source electrodes making up respectively a lower portion of the source electrode;

a fourth step of forming a fourth conductive film on the transparent insulation substrate and patterning the fourth conductive film to form simultaneously a plurality of upper-layer data lines making up respectively an upper portion of the data line, the plurality of the picture element electrodes, a plurality of upper-layer drain electrodes making up respectively an upper portion of the drain electrode, and a plurality of upper-layer source electrodes making up respectively an upper portion of the source electrode; and a fifth step of forming a protecting insulation film on the transparent insulation substrate, subsequently forming the oriented film on protecting insulation film by performing rubbing processing.

In the foregoing third aspect, a preferable mode is one wherein the first and the second conductive films are made of a same kind of conductive material.

Also, a preferable mode is one wherein the first, second, third and fourth conductive films are made of a same kind of conductive material.

With the above configuration of the first aspect or the second aspect, while the common electrode and the picture element electrode which make up the main portion of a unit picture element are both made up of a thin conductive layer, the common electrode wiring line to which the common electrode is connected and the data line (drain wiring line) to which the picture element electrode is connected, respectively are made up of a thick conductive layer, so that it is possible to reduce the size of a step which occurs in such a portion of the oriented film being formed above the common electrode or the picture element electrode.

Furthermore, with the above configuration of the third aspect, only by repeatedly forming a first conductive film and a second conductive film and also using a known photolithographic technology, it is possible to easily manufacture an LCD device having such a configuration as to enable conducting rubbing processing sufficiently without reducing the wiring line resistance of wiring lines such as the common electrode wiring and the data line or a like which are connected to the common electrode and the picture element electrode respectively.

In addition, it is possible to reduce the size of a step which occurs on the oriented film, to thereby achieve a high.

BRIEF DESCRIPTION OF THE DRAWINGS

The above and other objects, advantages, and features of the present invention will be more apparent from the following description taken in conjunction with the accompanying drawings, in which.

DETAILED DESCRIPTION OF THE PREFERRED EMBODIMENTS

The best mode of carrying out the present invention will be described in further detail using various embodiments with reference to the accompanying drawings.

Figure 1:
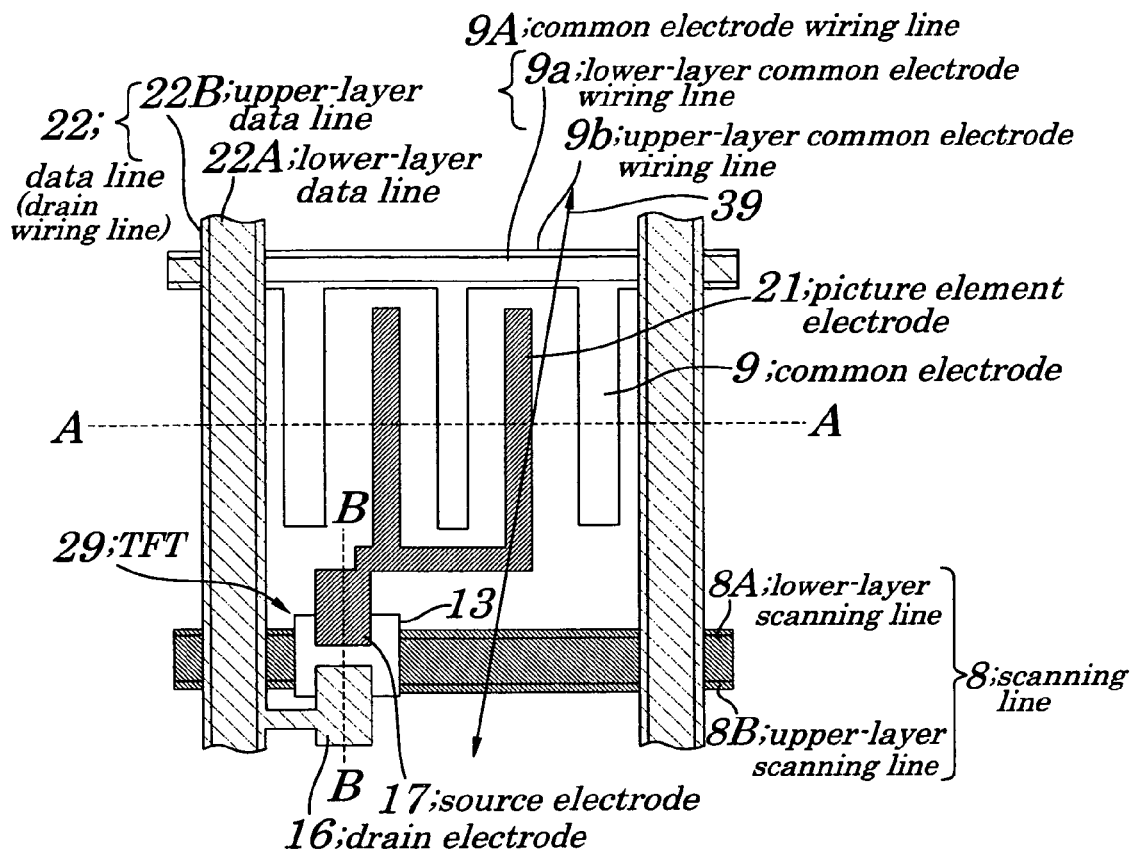
FIG. 1 is a plan view for showing a configuration of one unit picture element making up an LCD device according to an embodiment of the present invention.
Figure 2:
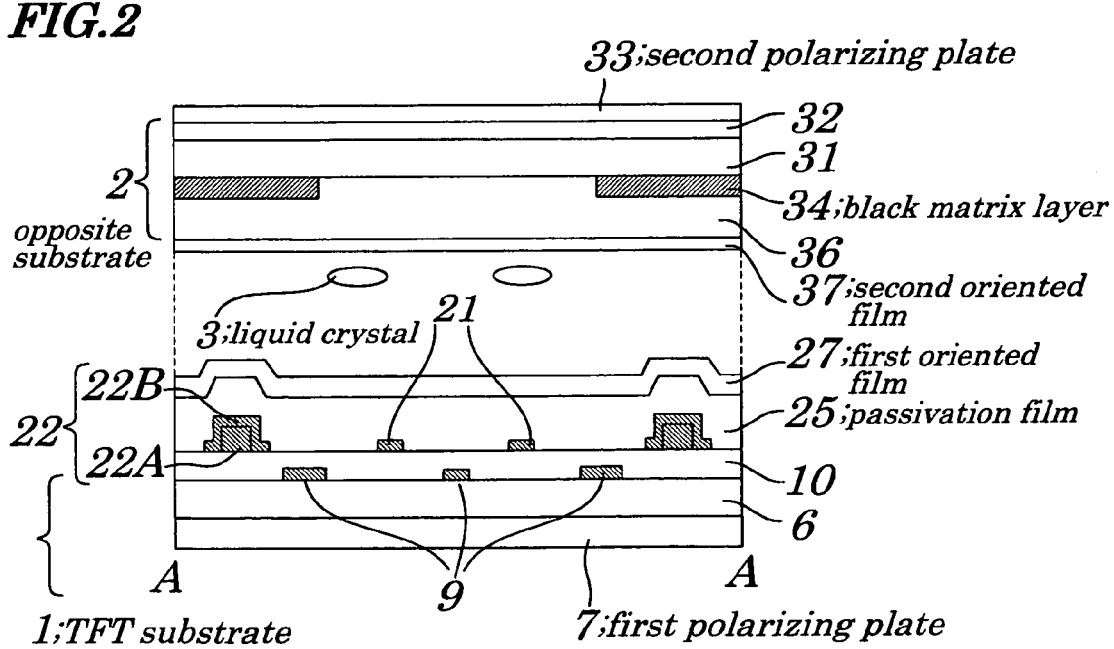
FIG. 2 is a cross-sectional view for showing the same unit picture element, taken along line A-A of FIG. 1.
Figure 3:
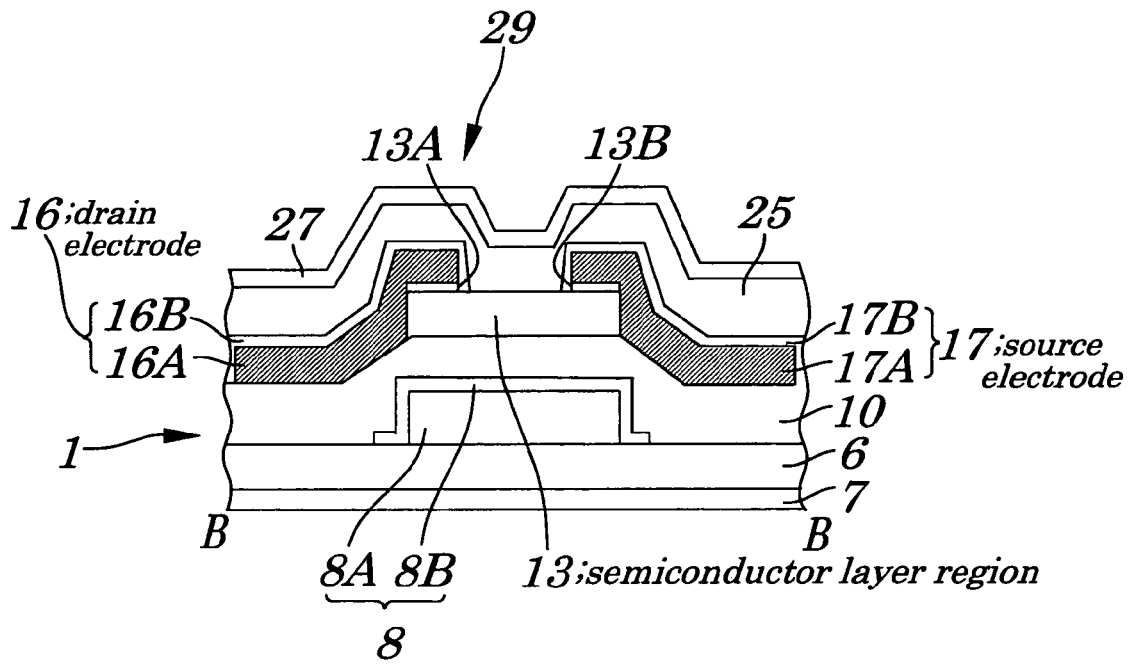
FIG. 3 is a cross-sectional view for showing the same unit picture element, taken along line B-B of FIG. 1, wherein only a TFT substrate is shown.

As shown in FIGS. 1 to 3, the LCD device of this embodiment has liquid crystal 3 sealed hermetically between a TFT substrate 1 and an opposite substrate 2. The TFT substrate 1 is made up of a first transparent insulation substrate 6 made of glass or a like, a first polarizing plate 7 formed on the outer side face of the first transparent insulation substrate 6, a plurality of scanning lines (serving as gate bus lines) 8 which is made of Cr and formed on the inner side face of the first transparent insulation substrate 6, a plurality of common electrodes 9 formed on the inner side face of the first transparent insulation substrate 6, an inter-layer insulation film 10 (serving as a gate insulation film as well) which is made of $SiO_2$, SiN, or a like and formed in such a manner as to cover the scanning lines 8 and the common electrodes 9, a plurality of semiconductor lay regions 13 which is made of an a-Si film or a like and formed above the scanning lines 8 via the inter-layer insulation film 10, ohmic layers 13A and 13B which are made of an $n^+$ type a-Si film or a like and formed at both ends of each of the semiconductor layer regions 13, plural pairs of drain electrodes 16 and source electrodes 17, each pair of which are made of Cr and formed in such a manner as to be connected to the ohmic layers 13A and 13B respectively, a plurality of picture element electrodes 21 and a plurality of data lines 22 which are formed integrally with the drain electrodes 16 and the source electrodes 17 respectively on the inter-layer insulation film 10, a passivation film (protecting insulation film) 25 which is made of $SiO_2$, SiN, or a like and formed in such a manner as to cover the picture element electrodes 21 and the data lines 22, and a first oriented film 27 which is made of poly-imide or a like and formed in such a manner as to cover the picture element electrodes 21 and the data lines 22 via the passivation film 25. Each of the picture element electrodes 21 and each of the common electrodes 9 are located in such a manner as to be opposite to each other in an approximately planar direction. In this construction, the scanning line 8, the semiconductor layer region 13, the drain electrode 16, and the source electrode 17 are combined to make up a TFT 29. It is to be noted that such a portion of the scanning line 8 as to be present directly below the semiconductor layer region 13 acts as a gate electrode. Furthermore, the data line 22 acts as a drain wiring line. Similarly, portions of the common electrodes 9 other than such a portion thereof as to be opposite to the picture element electrode 21 act as a common electrode wiring line 9A.

As can be seen from FIGS. 1 to 3, the common electrodes 9 and the picture element electrode 21 which make up the main portion of a unit picture element of the LCD device are made up of a Cr layer (second conductive film) being a relatively thin film (50-100 nm). The scanning line 8, on the other hand, is made up of a lower-layer scanning line 8A which is made of a Cr layer (first conductive film) being a relatively thick film (200-400 nm) and an upper-layer scanning line 8B which is made of a Cr layer (second conductive film) being a thin film (50-100 nm). Similarly, the common electrode wiring line 9A connected to the common electrodes 9 is formed as a stacked film made up of a lower-layer common electrode wiring line 9a of a thick Cr layer (first conductive film) having a range of 200 nm through 400 nm in thickness and an upper-layer common electrode wiring line 9b of a thin Cr layer (second conductive film) having a range of 50 nm through 100 nm in thickness. The data line 22, on the other hand, is formed as a stacked film made up of a lower-layer data line 22A of a thick Cr layer (first conductive film) having a range of 200 nm through 400 nm in thickness and an upper-layer data line 22B of a thin Cr layer (second conductive film) having a range of 50 nm through 100 nm in thickness. Furthermore, the drain electrode 16 of the TFT 29 is formed as a stacked film made up of a lower-layer drain electrode 16A of a thick Cr layer (first conductive film) having a range of 200 nm through 400 nm in thickness and an upper-layer drain electrode 16B of a thin Cr layer (second conductive film) having a range of 50 nm through 100 nm in thickness, while the source electrode 17 is formed as a stacked film made up of a lower-layer source electrode 17A of a thick Cr layer (first conductive film) having a range of 200 nm through 400 nm in thickness and an upper-layer source electrode 17B of a thin Cr layer (second conductive film) having a range of 50 nm through 100 nm in thickness.

As described above, by using the thin second conductive film to make up the common electrodes 9 and the picture element electrode 21 which make up the main portion of a unit picture element, it is possible to reduce the size of a step formed in the first oriented film 27 when it is formed via the passivation film (protecting insulation film) 25, thus conducting rubbing processing on the first oriented film 27 sufficiently. By forming each of the scanning line 8, the common electrode wiring line 9A, and the data line 22 as a stacked film having a two-layer structure of a thick first conductive and a thin second conductive film, on the other hand, wiring line resistance can be reduced. Furthermore, by similarly forming the drain electrode 16 and the source electrode 17 of the TFT 29 as a stacked film having a two-layer structure of the thick first conductive film and the thin second conductive film, it becomes possible to prevent the electrodes from being broken.

In this case, for example, to make up the scanning line 8 of a stacked film made of the lower-layer scanning line (thick first conductive film) 8A and the upper-layer scanning line (thin second conductive film) 8B, as shown in FIG. 3, preferably they are formed in such a geometry that the lower-layer scanning line 8A may be covered by the upper-layer scanning line 8B. To do so, the upper-layer scanning line 8B can be formed so that the width thereof may be not less than that of the lower-layer scanning line 8A. This is because, as described later, these two scanning lines, the lower-layer scanning line 8A and the upper-layer scanning line 8B can be formed precisely in shape when they are patterned sequentially indifferent process steps through etching by applying photolithography. Accordingly, the scanning lines, the lower-layer scanning line 8A and the upper-layer scanning line 8B can both be formed with less fluctuations in wiring line resistance. This holds true also with the common electrode wiring line 9A, the drain electrode 16, the source electrode 17, and the data line 22.

Thus, when a wiring line or an electrode is formed as a stacked film made up of the thick first conductive film and the thin second conductive film, photolithography can be applied effectively on a portion having a large step other than a position where the common electrodes 9 or the picture element electrodes 21 are formed. It is to be noted that it is of no problem if, as shown in FIG. 2, a step occurs at such a position on the oriented film 27 as to be present directly above a wiring line such as the data line 22 which is formed as a stacked film made up of the lower-layer data line (thick film) 22A and the upper-layer data line (thin film) 22B, because this position is covered by a plurality of black matrix layer regions 34 of the opposite substrate 2.

The opposite substrate 2, on the other hand, includes a second transparent insulation substrate 31 made of glass or a like, a second polarizing plate 33 formed on the outer side face of the second transparent insulation substrate 31 via a conductive layer 32 for preventing electrostatic-electricity, the black matrix layer regions 34 made of Cr, Ti, or a like, each of which is formed on the inner side face of the second transparent insulation substrate 31, a flattening film 36 formed in such a manner as to cover the black matrix layer regions 34, and a second oriented film 37 which is made of poly-imide or a like and formed on the flattening film 36. Furthermore, an direction arrow indicates a rubbing direction 39 in which rubbing processing is conducted on the first oriented film 27.

The following will describe a method for manufacturing the LCD device according to the present embodiment along process steps with reference to FIGS. 4A and 4B, 5A and 5B, 6A and 6B, 7A, and 7B, and 8A and 8B. It is to be noted that FIGS. 4A, 5A, 6A, 7A, and 8A show respective cross-sectional views which correspond to a cross-sectional view taken along line A-A of FIG. 1, while FIGS. 4B, 5B, 6B, 7B, and 8B show respective cross-sectional views which correspond to a cross-sectional view taken along line B-B of FIG. 1.

Figure 4A:
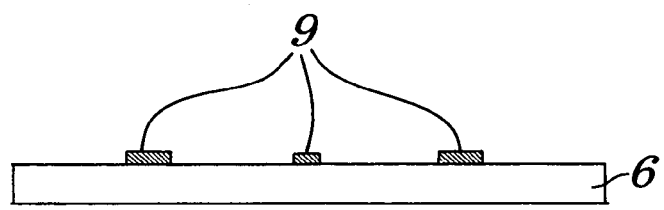
FIGS. 4A and 4B are flow diagrams for showing along steps a method for manufacturing the LCD device according to the same embodiment of the present invention.
Figure 4B:
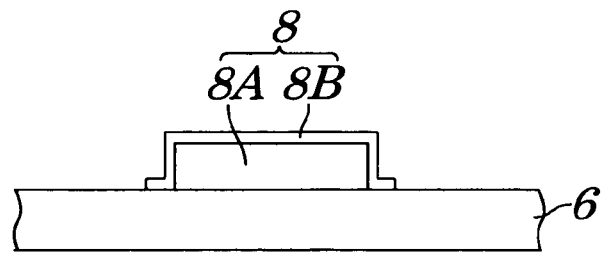

First, as shown in FIGS. 4A and 4B, on the first transparent insulation substrate 6 made of glass or the like, a thick conductive film (first conductive film) which is made of Cr and has a film thickness of 200-400 nm is formed throughout the surface by sputtering and then, using a known photolithographic method, is patterned to form the lower-layer scanning line 8A simultaneously with the lower-layer common electrode wiring line 9a (shown in FIG. 1) which is made of this conductive film. Next, similarly, a thin conductive film (second conductive film) which is made of Cr and has a film thickness of 50-100 nm is formed throughout the surface and then, using a known photolithographic method, is patterned to form the upper-layer scanning lines 8B simultaneously with the common electrodes 9 which are made of this conductive film. Now, each of the scanning lines 8 is formed as a stacked film of the lower-layer scanning line 8A made of the thin Cr layer (first conductive film) and the upper-layer scanning line 8B made of the thin Cr layer (second conductive film). As a result, each of the scanning lines 8 has a reduced wiring line resistance, because of a sufficiently thick film.

As described above, when patterning the thick first conductive film to form the lower-layer scanning line 8A and then patterning the thin second conductive film to form the upper-layer scanning line 8B, the thin second conductive film is patterned specifically so that the width of the upper-layer scanning line 8B may be roughly the same as or larger than that of the lower-layer scanning line 8A. For this purpose, when patterning the thin second conductive film by photolithography, the thin second conductive film can be or etched by forming a resist mask having an area which is larger than or roughly the same as that of a resist mask used to pattern the lower-layer scanning line 8A, in such a manner as to cover such a portion of the thin second conductive film as to be present above the lower-layer scanning line 8A.

By patterning the thin second conductive film in such a manner, it is possible to prevent the lower-layer scanning line 8A already formed from being etched off unduly even if the resist mask for forming the upper-layer scanning line 8B has become misaligned with the lower-layer scanning line 8A, thus forming the shapes of both lower-layer scanning line 8A and the upper-layer scanning line 8B accurately. Hereinafter, similar processing is performed when the thick first conductive film is patterned to form the a lower-layer film and then the thin second conductive film is patterned to form the upper-layer film, thus forming the wiring line or the electrode.

Figure 5A:
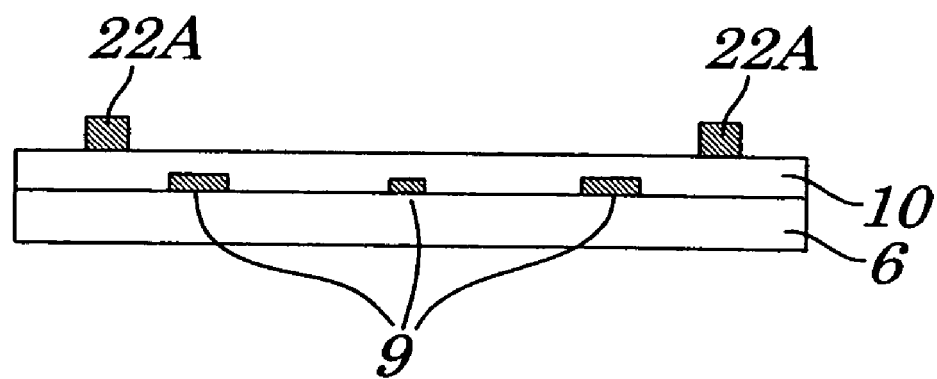
FIGS. 5A and 5B are continued flow diagrams for showing along steps the method for manufacturing the LCD device according to the same embodiment of the present invention.
Figure 5B:
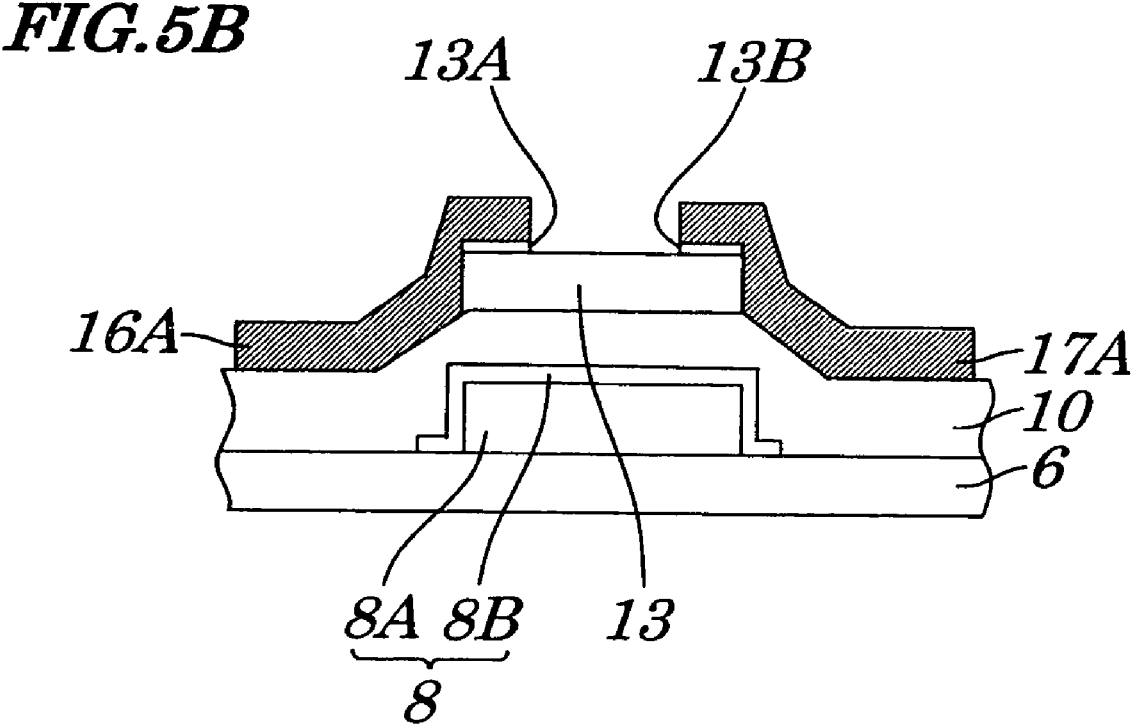

Next, as shown in FIGS. 5A and 5B, the inter-layer insulation film 10 which is made of a $SiO_2$ film, a SiN film, or a like and partially provides a gate insulation film is formed throughout the surface by using a CVD method, on which inter-layer insulation film 10 are sequentially formed the semiconductor layer region 13 made of a-Si or a like and the ohmic layers 13A and 13B made of an $n^+$ type a-Si film or the like at both ends of the semiconductor layer region 13. Next, a thick conductive film (first conductive film) which is made of Cr and has a film thickness of 200-400 nm is formed throughout the surface by sputtering and then is patterned by a known photolithographic method to form the lower-layer data lines 22A, a lower-layer drain electrode 16A, and a lower-layer source electrode 17A simultaneously.

Figure 6A:
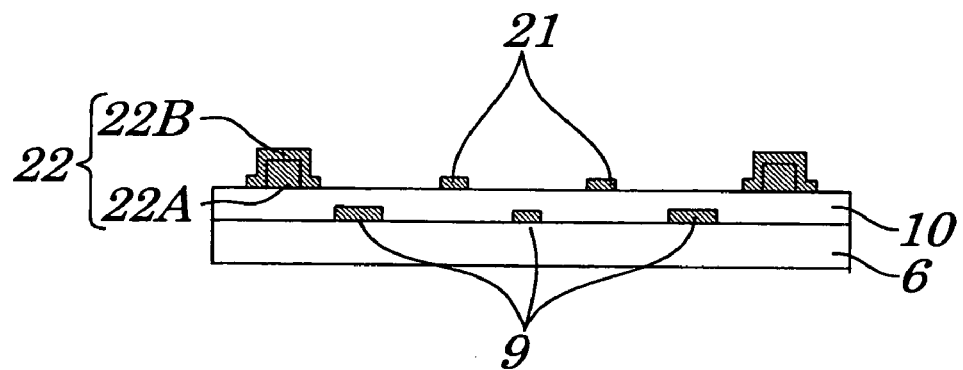
FIGS. 6A and 6B are continued flow diagrams for showing along steps the method for manufacturing the LCD device according to the same embodiment of the present invention.
Figure 6B:
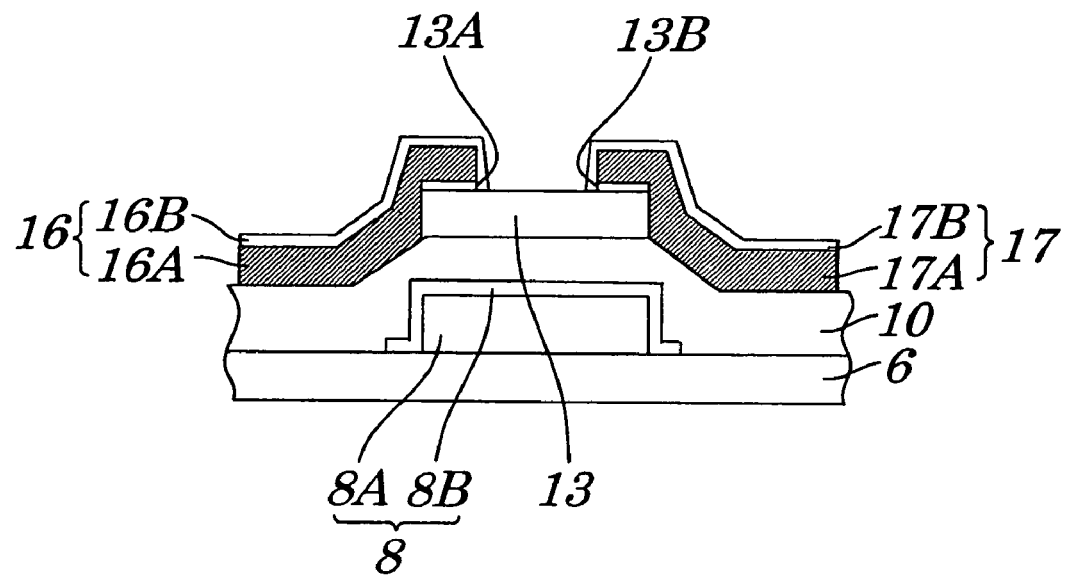

Next, as shown in FIGS. 6A and 6B, a thin conductive film (second conductive film) which is made of Cr and has a film thickness of 50-100 nm is formed throughout the surface by sputtering and then, using a known photolithographic method, is patterned to form the upper-layer data lines 22B simultaneously with the picture element electrode 21, the upper-layer drain electrode 16B, and a source electrode 17B which are made of this film. Now, such the data lines 22 is formed that the upper-layer data line 22B made of the thin Cr layer (second conductive film) is stacked on the lower-layer data lines 22A made of the Cr layer (first conductive film) being a thick film. As a result, each of the data lines 22 has a reduced wiring line resistance, because of a sufficiently thick film.

Furthermore, the drain electrode 16 is formed having such a configuration that the a lower-layer drain electrode 16A made of the thick Cr layer (first conductive film) and the upper-layer drain electrode 16B made of the thin Cr layer (second conductive film) are stacked one on the other. Similarly, the source electrode 17 is formed having such a configuration that the a lower-layer source electrode 17A made of the Cr layer (first conductive film) being a thick film and the upper-layer source electrode 17B made of the thin Cr layer (second conductive film) are stacked one on the other. By thus forming each of the drain electrode 16 and the source electrode 17 as a stacked film having a two-layer structure made of the thick first conductive film and the thin second conductive film, it is possible to have a sufficient film thickness as compared to the case where it is made up of a one-layer structure, thus preventing the electrodes from being broken.

Figure 7A:
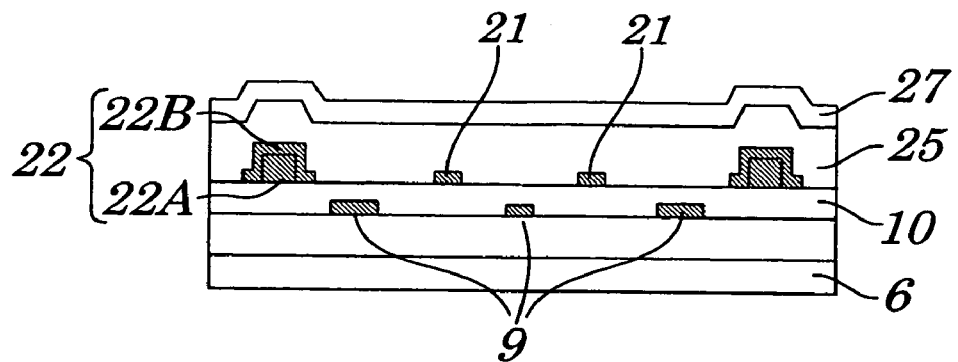
FIGS. 7A and 7B are continued flow diagrams for showing along steps the method for manufacturing the LCD device according to the same embodiment of the present invention.
Figure 7B:
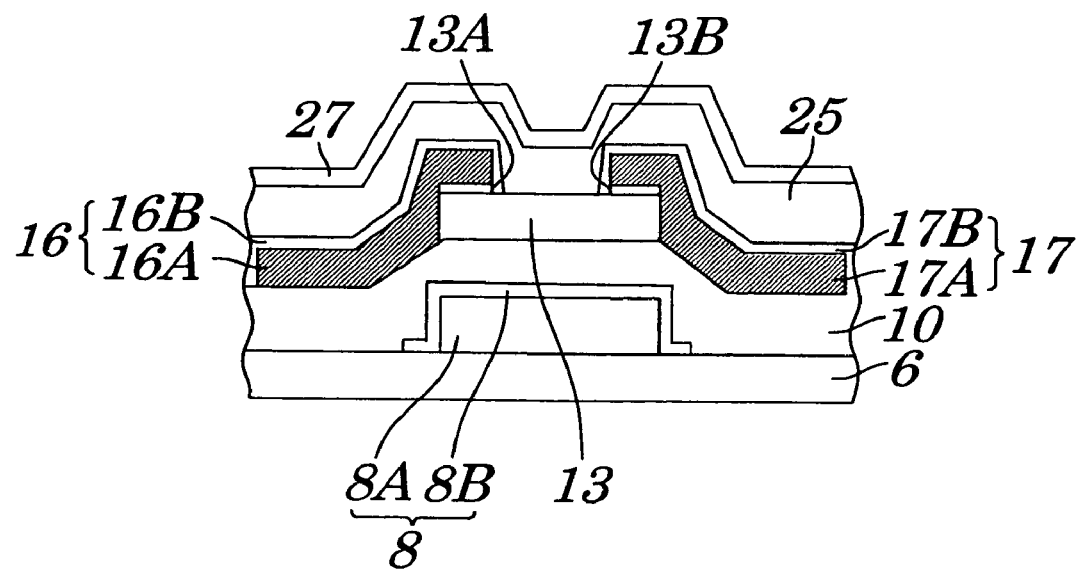
Figure 12:
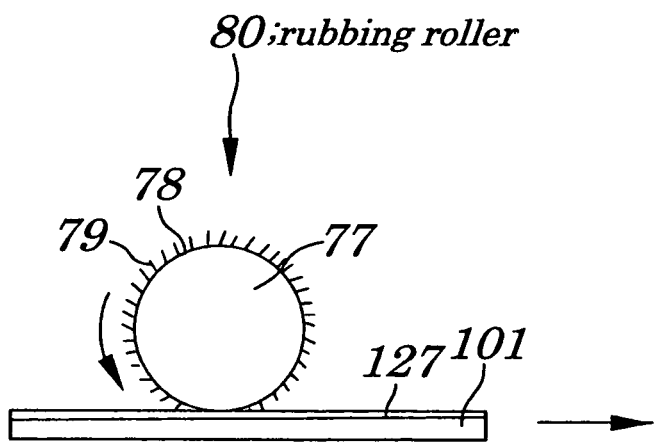
FIG. 12 an illustration for outlining rubbing processing to be conducted on the conventional LCD device.
Figure 13A:
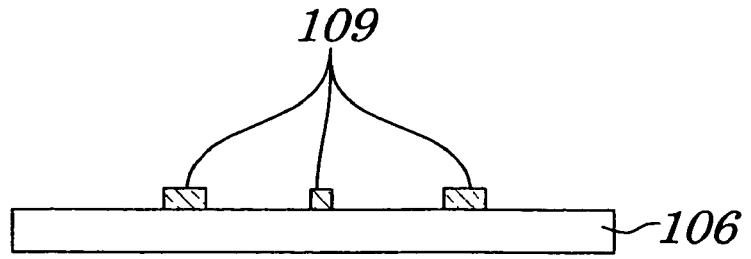
FIGS. 13A and 13B are continued flow diagrams for showing a conventional method for manufacturing the conventional LCD device along steps.
Figure 13B:
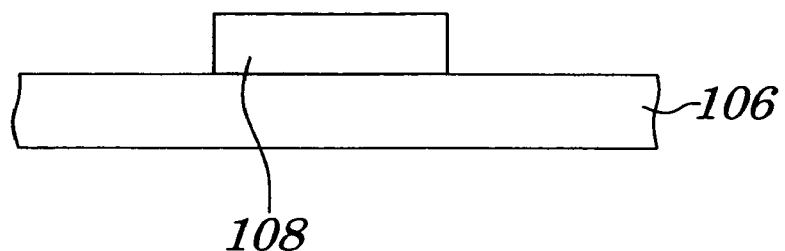
Figure 14A:
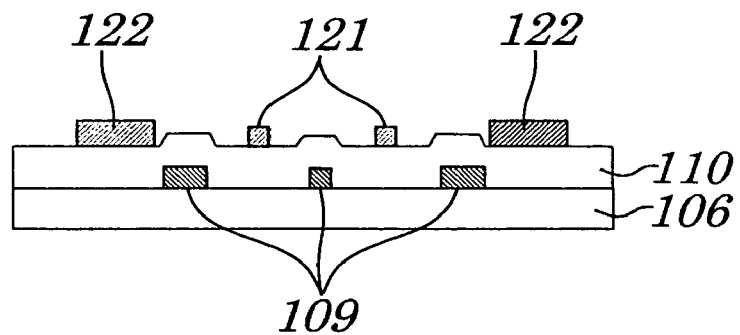
FIGS. 14A and 14B are continued flow diagrams for showing the conventional method for manufacturing the conventional LCD device along steps.
Figure 14B:
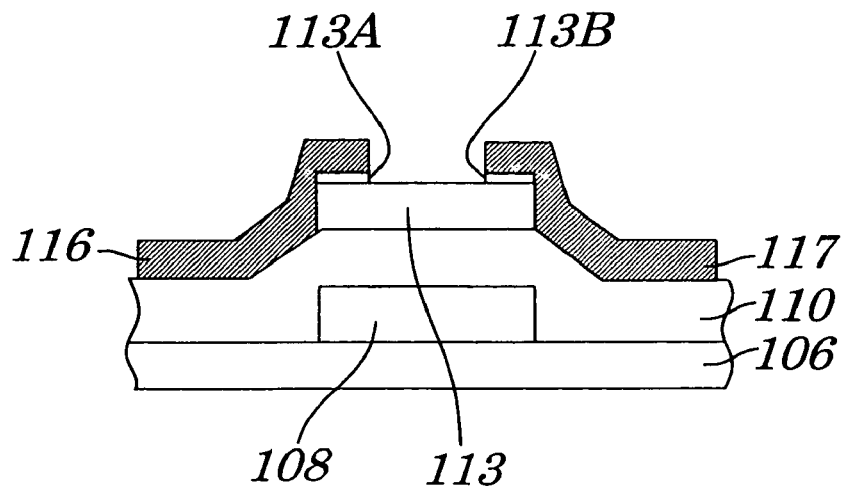
Figure 15A:
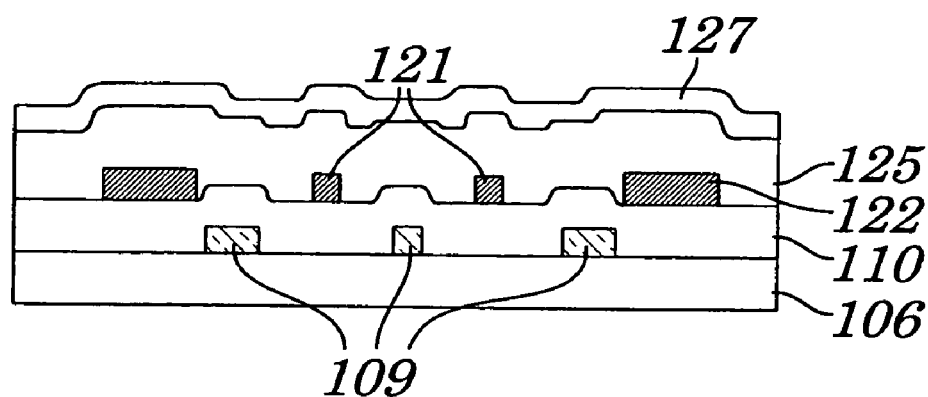
FIGS. 15A and 15B are continued flow diagrams for showing the conventional method for manufacturing the conventional LCD device along steps.
Figure 15B:
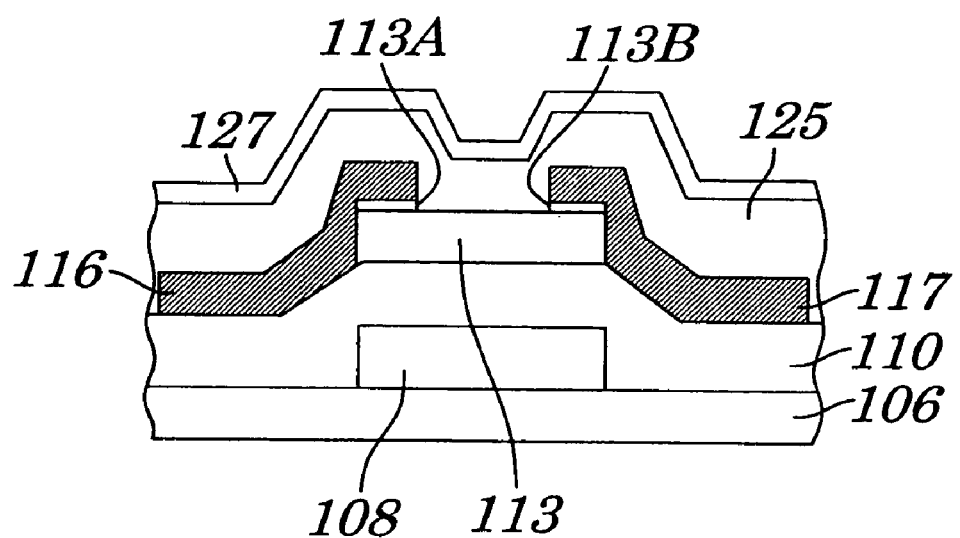
Figure 16A:
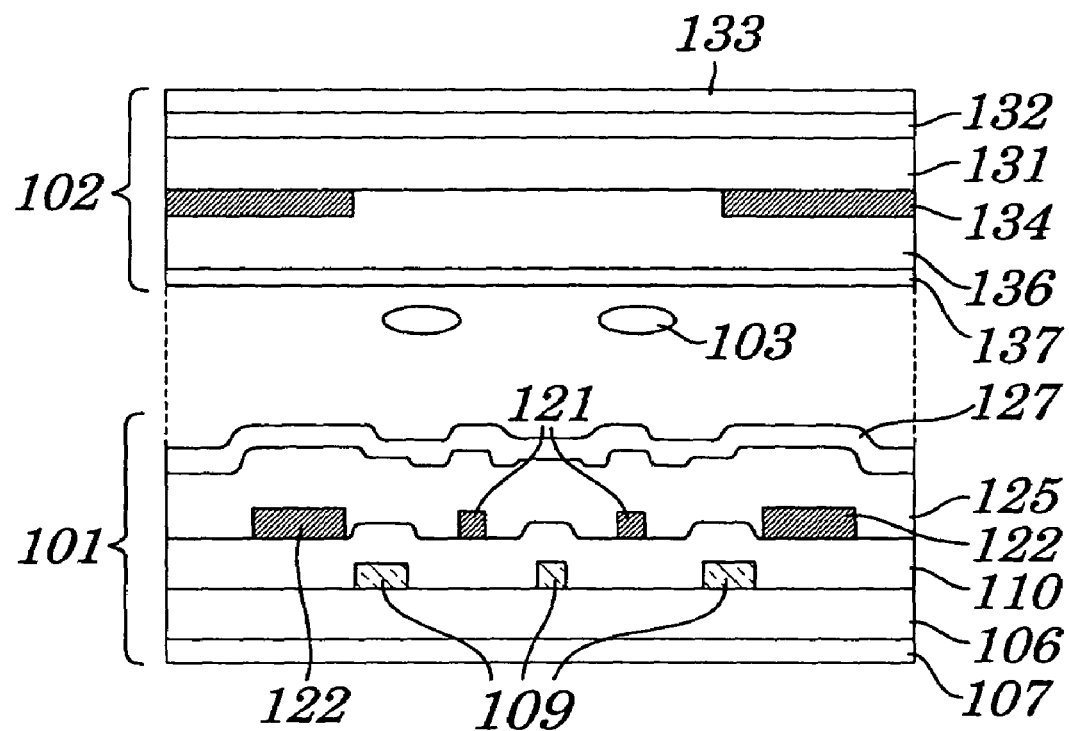
FIGS. 16A and 16B are continued flow diagrams for showing the method for manufacturing the LCD device along steps.
Figure 16B:
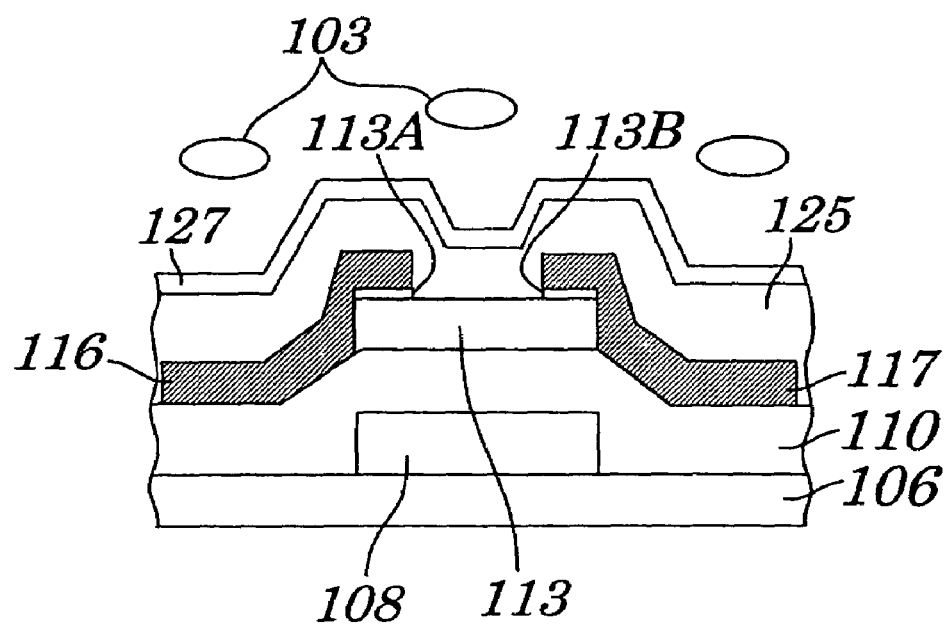

Next, as shown in FIGS. 7A and 7B, the passivation film (protecting insulation film) 25 made of a $SiO_2$ film, a SiN film, or the like is formed throughout the surface by using a CVD method and then, the first oriented film 27 made of poly-imide or the like is formed in such a manner as to cover the passivation film 25. Then, the rubbing processing is conducted on the first oriented film 27 using a rubbing roller 80 such as shown in FIG. 12.

Figure 8A:
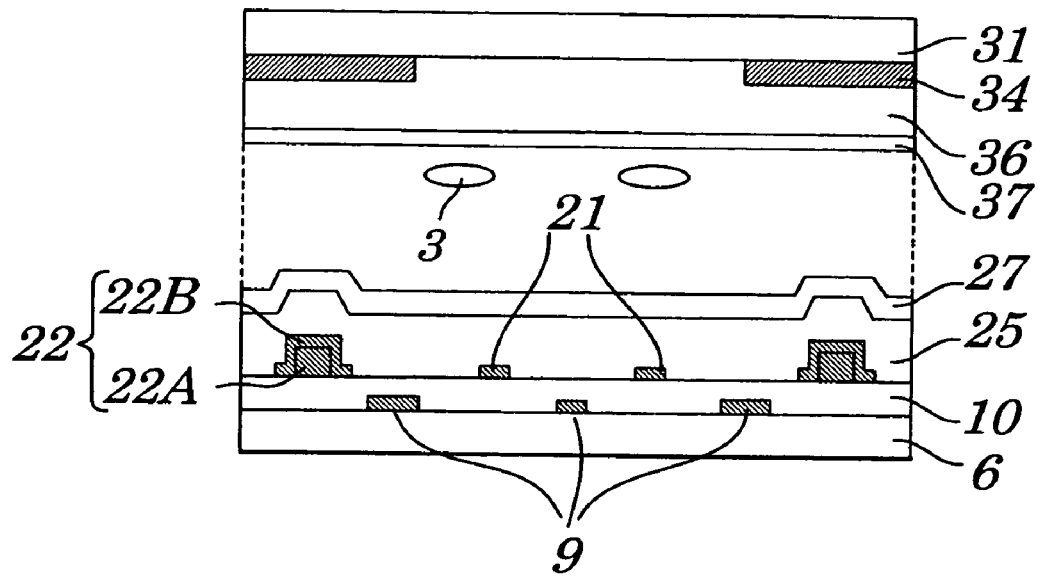
FIGS. 8A and 8B are continued flow diagrams for showing along steps the method for manufacturing the LCD device according to the same embodiment of the present invention.
Figure 8B:
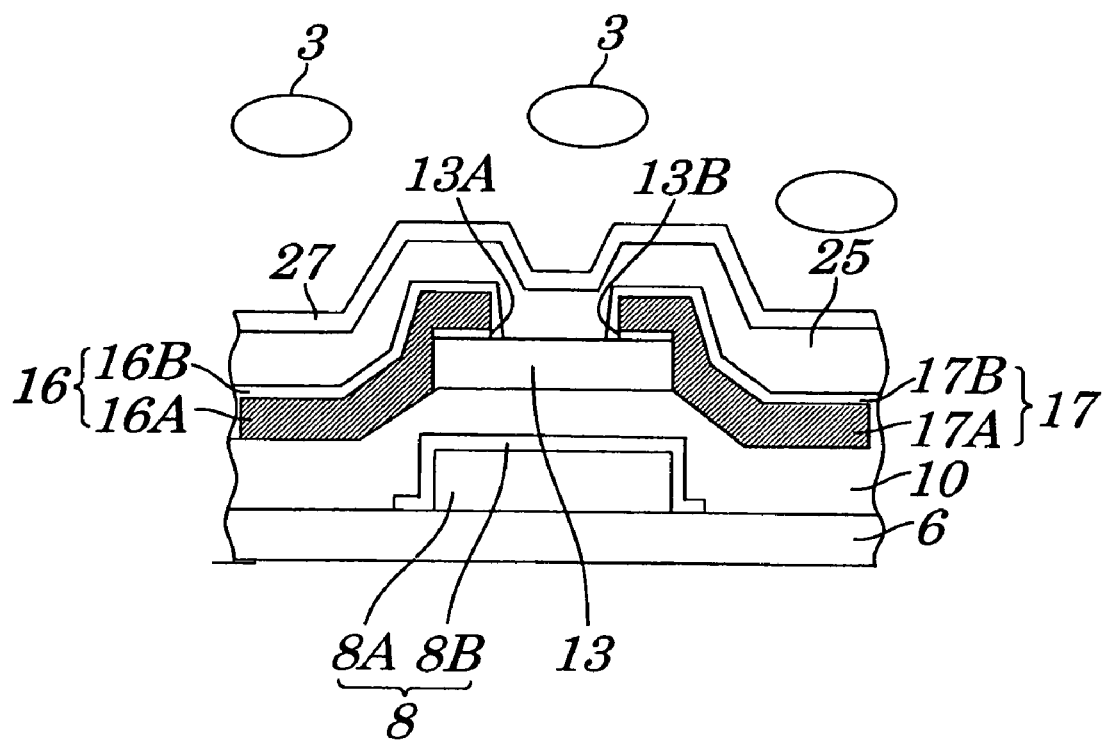
Figure 9:
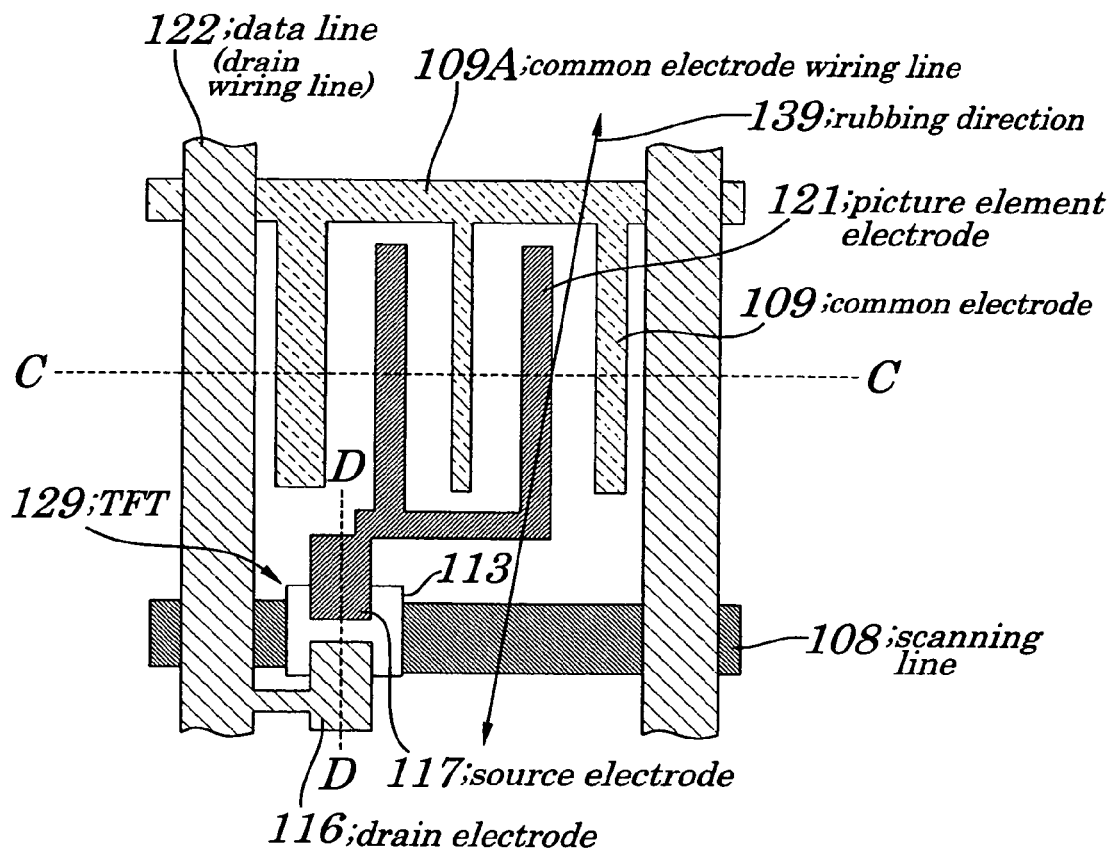
FIG. 9 is a plan view for showing a configuration of a conventional LCD device.
Figure 10:
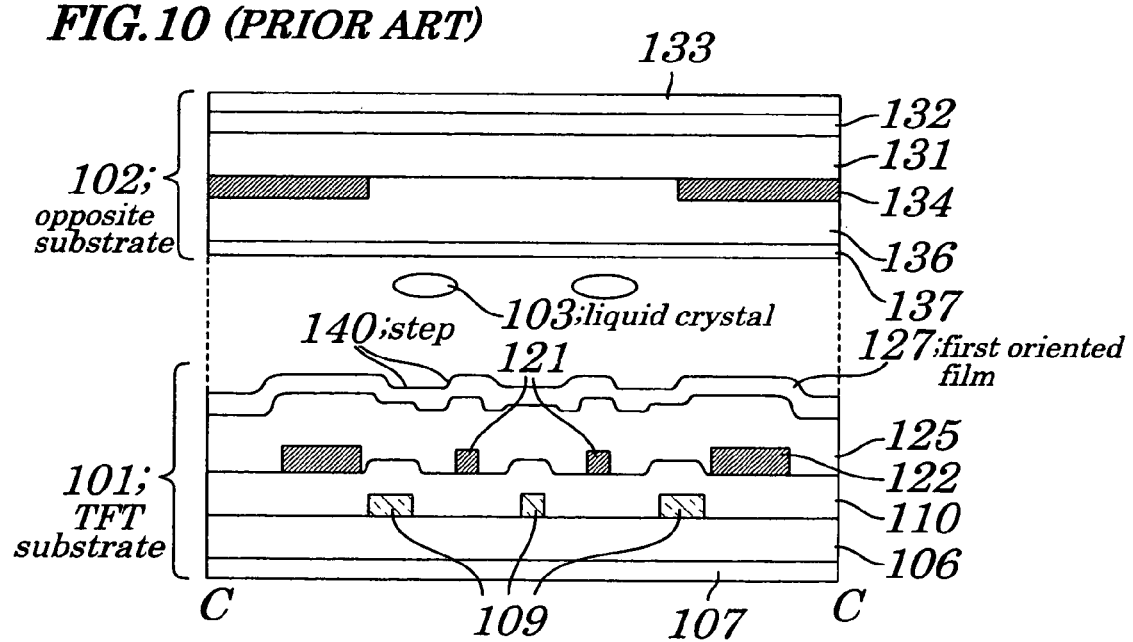
FIG. 10 is a cross-sectional view taken along line C-C of FIG. 9.
Figure 11:
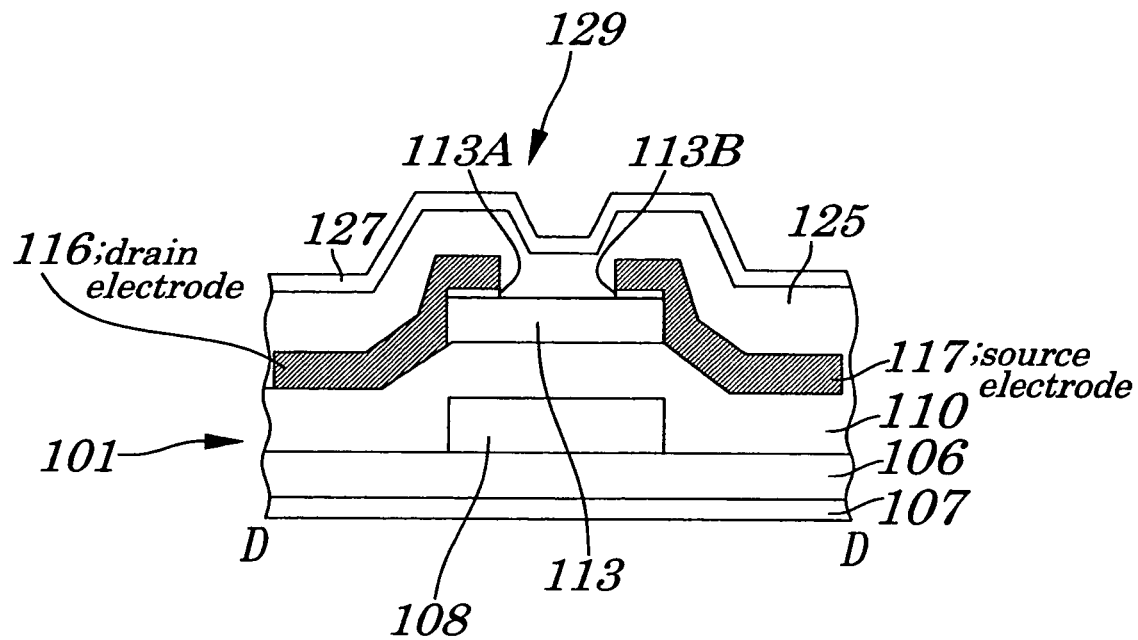
FIG. 11 is a cross-sectional view taken along line D-D of FIG. 9.

Next, as shown in FIGS. 8A and 8B, the liquid crystal 3 is hermetically sealed between the TFT substrate 1 and the opposite substrate 2 which is made by sequentially forming a plurality of black matrix layer regions 34 made of Cr, Ti, or the like, the flattening film 36, and the second oriented film 37 made of poly-imide or the like on the inner side face of the second transparent insulation substrate 31 made of glass or the like. Then, the first polarizing plate 7 is formed on the outer side face of the TFT substrate 1 and the second polarizing plate 33 is formed via the conductive layer 32 for preventing electrostatic-electricity on the outer side of the opposite substrate 2, thus completing such the LCD device as shown in FIGS. 1 to 3.

With the LCD device as described above, the common electrodes 9 and the picture element electrode 21 which make up the main portion of a unit picture element are both made up of a Cr layer (second conductive film) being a thin film (50-100 nm), so that when the first oriented film 27 is formed above the common electrodes 9 and the picture element electrode 21, it is possible to decrease the size of the step which occurs in the first oriented film 27. As a result, the rubbing processing can be conducted on the first oriented film 27 sufficiently because it is not interfered by the step.

Therefore, even in a case where such the LCD device as described above is used as a monitor of medical-care equipment, the orientation of the liquid crystal 3 can be improved correspondingly because the rubbing processing can be conducted on the first oriented film 27 sufficiently, so that it is possible to achieve a high contrast and prevent the contrast from being decreased even on, especially, a normal-black LCD device.

Also, with the method of manufacturing the above-mentioned LCD device, only by repeatedly forming a thick first conductive film and a thin second conductive film and also using a known photolithographic technology, it is possible to easily manufacture the LCD device having such a configuration as to enable conducting the rubbing processing sufficiently without increasing the wiring line resistance of wiring lines such as the common electrode wiring line 9A and the data line 22 or a like which are connected to the common electrodes 9 and the picture element electrode 21 respectively.

As described above, with the LCD device according to the present embodiment, while the common electrodes 9 and the picture element electrode 21 which make up the main portion of a unit picture element are both made up of a thin conductive layer, the common electrode wiring line 9A and wiring lines such as the data line 22 which are connected to the common electrodes 9 and the picture element electrode 21 respectively are formed as a stacked film made up of the thick first conductive film and the thin second conductive film, so that it is possible to reduce the size of the step which occurs in such a portion of the first oriented film 27 as to be formed above the common electrodes 9 or the picture element electrode 21.

Therefore, it is possible to reduce the size of the step which occurs on the first oriented film 27, to thereby achieve a high contrast without increasing the wiring line resistance.

It is apparent that the present invention is not limited to the above embodiments but may be changed and modified without departing from the scope and spirit of the invention.

For example, although the embodiment has been described in an example of forming both the picture element electrode and the common electrodes on the TFT substrate, they may be formed on the opposite electrode not on the TFT electrode. Furthermore, although the embodiment has been described in an example of applying the present invention to a LCD device, the present invention may be applied also to a color LCD device not only to a monochromatic one.

Furthermore, although the embodiment has been described in an example of using Cr as the conductive material of the various electrodes and wiring lines which are used as the same kind of conductive films, any other conductive materials such as Al (aluminum) or Mo (molybdenum) other than Cr (chrome) may be used to form these electrodes and wiring lines which are used as the same kind of conductive films or they may be used in combination to form them which are used as different kinds of conductive films. Furthermore, although the embodiment has been described in an example of using amorphous silicon as the material of the conductive layer of the TFT which is formed on the TFT substrate, any other semiconductor materials such as poly-silicon may be used. Furthermore, it is not always necessary to use a static-electricity preventing conductive layer when forming the second polarizing plate on the opposite substrate. Furthermore, the conditions of the film thickness values of the various electrodes and wiring lines, the means for forming the films of the conductive materials or insulating materials, or a like have been described as one example and so can be modified arbitrarily according to purposes, use, or a like.

As described above, according to the LCD device configuration of the present invention, while the common electrodes and the picture element electrode which make up the main portion of the unit picture element are both made up of a thin conductive layer, wiring lines which are connected to the common electrodes and the picture element electrode respectively are made up of a thick conductive film, so that it is possible to reduce the size of the step which occurs in such a portion of the oriented film as to be present above the common electrodes or the picture element electrode.

Furthermore, the method of manufacturing the LCD device according to the present embodiment, only by repeatedly forming the same kind of or different kinds of conductive films and also using a known photolithographic technology, it is possible to easily manufacture the LCD device having such a configuration as to enable conducting the rubbing processing sufficiently without increasing the wiring line resistance of wiring lines which are connected to the common electrodes and the picture element electrode respectively.

It is thus possible to achieve a high contrast by reducing the size of the step which occurs on the oriented film without increasing the wiring line resistance.

What is claimed is:

1. A method of manufacturing a liquid crystal display device, said method comprising:
   providing a first transparent insulation substrate;
   forming a first conductive film on said first transparent insulation substrate;
   patterning said first conductive film to form a plurality of lower-layer scanning lines, making up a lower portion of a scanning line serving as a gate electrode of a thin film transistor, and a plurality of lower-layer common electrode wiring lines, making up a lower portion of a common electrode wiring line;
   forming a second conductive film on said first transparent insulation substrate;
   patterning said second conductive film to form a plurality of upper-layer scanning lines, making up an upper portion of said scanning line, and a plurality of common electrodes electrically connected to said common electrode wiring line;
   forming an inter-layer insulation film on said first transparent insulation substrate;
   forming a plurality of regions of a semiconductor layer on said inter-layer insulation film;
   forming a third conductive film on said semiconductor layer;
   patterning said third conductive film to form a plurality of lower-layer data lines, making up a lower portion of a data line, a plurality of lower-layer drain electrodes, making up a lower portion of a drain electrode, and a plurality of lower-layer source electrodes, making up a lower portion of a source electrode;
   forming a fourth conductive film on said first transparent insulation substrate;
   patterning said fourth conductive film to form a plurality of upper-layer data lines, making up an upper portion of said data lines, a plurality of picture element electrodes, a plurality of upper-layer drain electrodes, making up an upper portion of said drain electrodes, and a plurality of upper-layer source electrodes, making up an upper portion of said source electrodes;
   forming a protecting insulation film on said first transparent insulation substrate; and
   performing rubbing processing to form a first oriented film on said protecting insulation film,
   said picture element electrodes and said common electrodes thereby respectively comprising a thin single layer of conductive film in a pixel area whereas said scanning lines and said data lines respectively comprise a thicker double layer of conductive material in a periphery of said pixel area.

2. The method according to claim 1, wherein said first and said second conductive films comprise a same conductive material.

3. The method according to claim 1, wherein said first, second, third and fourth conductive films comprise a same conductive material.

4. The method according to claim 1, wherein each of the conductive films is formed by sputtering a metal.

5. The method according to claim 1, wherein each of the conductive films is formed by metal deposition.

6. The method according to claim 1, further comprising:
   providing a second transparent insulation substrate; and
   forming black matrix layer regions on an inner face of said second transparent insulation substrate.

7. The method according to claim 6, further comprising:
   forming a flattening film on said inner face of said second transparent insulation substrate; and
   forming a second oriented film on said inner face of said second transparent insulation substrate.

8. The method according to claim 7, further comprising:
   hermetically sealing liquid crystals between said first transparent insulation substrate and said inner face of said second transparent insulation substrate.

9. The method according to claim 8, further comprising forming a first polarizing plate on an outer side of said first transparent insulation substrate, and forming a second polarizing plate on an outer side of said second transparent insulation substrate.

10. The method according to claim 1, wherein forming said second conductive film comprises forming to a thickness of 50-100 nm.

11. The method according to claim 1, further comprising forming a first oriented film via said inter-layer insulation film.

12. The method according to claim 11, further comprising rubbing said first oriented film.

13. The method according to claim 12, wherein said rubbing is conducted sufficiently to provide contrast that meets requirements for a monitor of medical-care equipment.

14. A method of manufacturing a thin film transistor layer of a liquid crystal display device, said method comprising:
   providing a transparent insulation substrate;
   forming a first conductive film on said transparent insulation substrate;
   patterning said first conductive film to form a plurality of lower-layer scanning lines, making up a lower portion of a scanning line serving as a gate electrode of a thin film transistor, and a plurality of lower-layer common electrode wiring lines, making up a lower portion of a common electrode wiring line;
   forming a second conductive film on said transparent insulation substrate; and
   patterning said second conductive film to form a plurality of upper-layer scanning lines, making up an upper portion of said scanning line, and a plurality of common electrodes electrically connected to said common electrode wiring line,
   said common electrodes thereby comprising a thin single layer of conductive film in a pixel area whereas said scanning lines comprise a thicker double layer of conductive material in a periphery of said pixel area.

15. The method according to claim 14, wherein said first and said second conductive films comprise a same conductive material.

16. The method according to claim 14, wherein forming said second conductive film comprises said second conductive film having a thickness less than a thickness of said first conductive film.

17. The method according to claim 14, wherein patterning said second conductive film comprises said upper-layer scanning lines having a width about the same as or larger than a width of said lower-layer scanning lines.

18. The method according to claim 14, further comprising forming an inter-layer insulation film on said transparent insulation substrate.

19. The method according to claim 18, further comprising forming an oriented film via said inter-layer insulation film.

20. The method according to claim 19, further comprising rubbing said oriented film sufficiently to provide contrast that meets requirements for a monitor of medical-care equipment.

* * * * *